US009672295B2

(12) United States Patent
Wong et al.

(10) Patent No.: US 9,672,295 B2
(45) Date of Patent: Jun. 6, 2017

(54) COMPUTER SYSTEM (71) Applicant: OnApp Limited, London (GB)

(72) Inventors: Whei Wong, Kuala Lumpur (MY); Wai Keen Woon, Kuala Lumpur (MY)

(73) Assignee: ONAPP LIMITED, London (GB)

( * ) Notice: Subject to any disclaimer, the term of this patent is extended or adjusted under 35 U.S.C. 154(b) by 308 days.

(21) Appl. No.: 14/317,080

(22) Filed: Jun. 27, 2014

(65) Prior Publication Data
US 2015/0012835 A1 Jan. 8, 2015

(30) Foreign Application Priority Data
Jul. 8, 2013 (MY) .................. PI 2013 002594

(51) Int. Cl.
*G06F 3/00* (2006.01)
*G06F 17/30* (2006.01)

(52) U.S. Cl.
CPC .... *G06F 17/3089* (2013.01); *G06F 17/30902* (2013.01)

(58) Field of Classification Search
CPC .......... H04L 29/0809; H04L 29/08072; G06F 17/30873; G06F 17/30899; G06Q 30/02
See application file for complete search history.

(56) References Cited

U.S. PATENT DOCUMENTS

| | | | | |
|---|---|---|---|---|
| 6,784,925 B1* | 8/2004 | Tomat | .................. | G06F 3/0481 348/207.11 |
| 6,973,505 B1* | 12/2005 | Schneider | ......... | G06F 17/30887 707/E17.115 |
| 9,058,402 B2* | 6/2015 | Ehrlich | ............. | G06F 17/30902 |
| 2002/0138621 A1* | 9/2002 | Rutherford | ............. | H04L 29/06 709/227 |
| 2004/0254935 A1* | 12/2004 | Chagoly | ........... | G06F 17/30899 |
| 2005/0027820 A1* | 2/2005 | O'Laughlen | ...... | G06F 17/30876 709/217 |
| 2005/0213147 A1* | 9/2005 | Minatogawa | ....... | G06F 17/3089 358/1.15 |
| 2005/0262125 A1* | 11/2005 | Kanai | ................ | G11B 20/1217 |
| 2007/0067416 A1* | 3/2007 | Gajda | .................... | H04L 29/06 709/217 |
| 2009/0024574 A1* | 1/2009 | Timmons | .......... | G06F 17/30864 |
| 2009/0044128 A1* | 2/2009 | Baumgarten | ..... | G06F 17/30905 715/738 |
| 2009/0279116 A1* | 11/2009 | Nishio | ................. | G06K 9/2081 358/1.13 |
| 2010/0153882 A1* | 6/2010 | Nakagawa | .......... | G06F 17/3028 715/838 |
| 2010/0199220 A1* | 8/2010 | Tanichi | ............. | G06F 17/30265 715/838 |

(Continued)

*Primary Examiner* — Nicholas Augustine
(74) *Attorney, Agent, or Firm* — R. Whitney Johnson; Stoel Rives LLP (57) ABSTRACT

A CDN accelerator computer system (32) is described that can allow a website to be provided in a content delivery network (CDN). The CDN accelerator (32) is configured to receive a request for web content from a user (20). Processors in the CDN accelerator can then retrieve HTML source code from an origin server (34) and modify the source code by changing the addresses of static content items to refer to addresses in a CDN. The CDN accelerator (32) can then send the modified HTML source code to the user (20), and the user's browser can acquire the static content items from the CDN.

11 Claims, 9 Drawing Sheets

(56) References Cited

U.S. PATENT DOCUMENTS

| | | | |
|---|---|---|---|
| 2010/0281357 A1* | 11/2010 | Fu | G06F 9/4445 |
| | | | 715/234 |
| 2010/0332589 A1* | 12/2010 | Schwimer | G06F 17/30902 |
| | | | 709/203 |
| 2010/0333204 A1* | 12/2010 | Shpits | G06F 21/562 |
| | | | 726/24 |
| 2011/0055314 A1* | 3/2011 | Rosenstein | G06F 17/30899 |
| | | | 709/203 |
| 2011/0099523 A1* | 4/2011 | van Zee | G03D 15/005 |
| | | | 715/838 |
| 2011/0264762 A1* | 10/2011 | Fu | G06F 17/3087 |
| | | | 709/217 |
| 2012/0124372 A1* | 5/2012 | Dilley | H04L 67/2819 |
| | | | 713/162 |
| 2012/0266057 A1* | 10/2012 | Block | G06Q 30/0277 |
| | | | 715/202 |
| 2013/0185164 A1* | 7/2013 | Pottjegort | G06Q 30/02 |
| | | | 705/14.73 |
| 2013/0326022 A1* | 12/2013 | Ehrlich | G06F 17/30902 |
| | | | 709/219 |
| 2014/0250366 A1* | 9/2014 | Bertram | G06F 17/3089 |
| | | | 715/234 |

* cited by examiner

COMPUTER SYSTEM

RELATED APPLICATIONS

This application claims priority under 35 U.S.C. §119 to Malaysian Patent Application No. PI 2013 002594, filed on Jul. 8, 2013, for "Computer System," the disclosure of which is hereby incorporated herein by reference in its entirety.

TECHNICAL FIELD

The present disclosure relates generally to a computer system and, in particular, the present disclosure relates to a computer system that can allow a website to be provided in a content delivery network.

BRIEF DESCRIPTION OF THE DRAWINGS

Embodiments of the present disclosure will now be described, purely by way of example, with reference to the accompanying drawings, in which.

DETAILED DESCRIPTION OF PREFERRED EMBODIMENTS

For a simple website a browser in a user device can acquire HTML source code and content items such as image and video files directly from a host computer or server. This one-to-one model is effective for a small number of users. Problems can arise as the number of users increases and significant demands are placed on the host computer or server. These problems can include a long load time for a website, failure of a website to load, or a system crash in the host computer or server. The user experience can be poor in these circumstances.

Content Delivery Networks ("CDN") have been developed to mitigate some of the problems in the one-to-one model. In a CDN content can be supplied separately from the host computer. Typically a CDN includes a number of servers distributed around the world. Website content can be supplied to multiple users from any of these servers to ensure a fast load speed.

Figure 1:
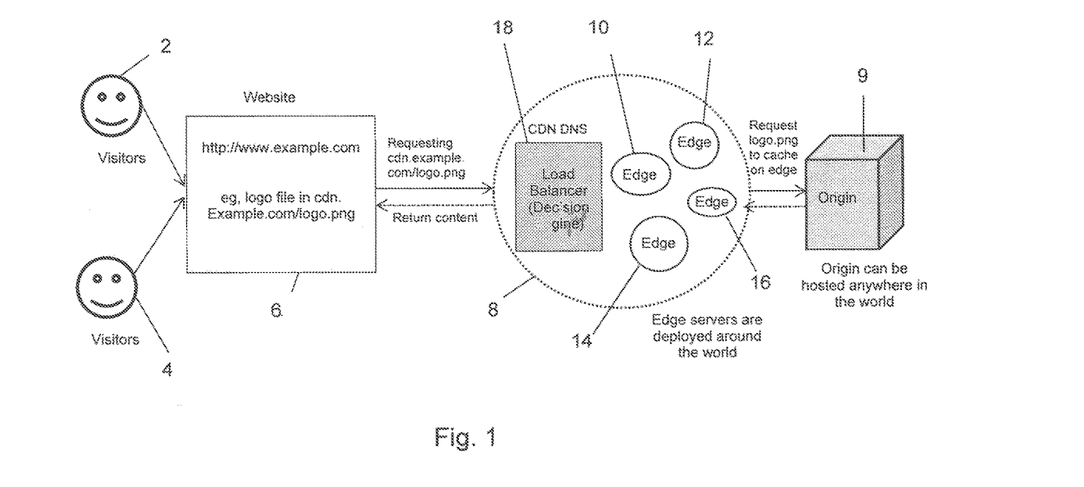
FIG. 1 is a schematic diagram showing the various participants in a traditional content delivery network ("CDN")

FIG. 1 is a schematic diagram showing the various participants in a traditional CDN. In this example, visitors 2, 4 can use web browsers to visit a website 6. Static content items such as image files can be acquired from the CDN 8. In the example of FIG. 1 a static content item is a logo file, referred to as example.com/logo.png. The CDN 8 comprises a plurality of edge servers 10, 12, 14, 16 and a load balancer 18. The logo file is stored at one or more of the edge servers 10, 12, 14, 16 and is supplied to the visitors' browsers when a request is submitted to load the website. The load balancer 18 decides which edge server should supply the logo file to the visitor 2, 4, based on current demands in the network.

The servers in the CDN 8 acquire the logo file from the origin 9 which can be hosted anywhere in the world. Thus, the logo file is available in the storage in the edge servers to that they can supply this to the visitors' browsers when a request is received.

In order to participate in a traditional CDN the website host must make a number of changes to their website. In particular, the website host must change the addresses of any static content items that should be supplied from the CDN. In the example of FIG. 1, the website host must change their website so that the logo file with original address http://www.example.com/logo.png can be supplied from a CDN. The website host must change the address of the logo file in the HTML source code of the website to http://cdn.example.com/logo.png. Thus, when the HTML source code is received by the user device its browser will seek to acquire the logo file from the CDN address rather than the origin. The website must also be registered with the CDN provider so that the CDN resource is created with a specific address. In this way the CDN provider will be aware of the origin address so that data can be fetched. The website host must also change the website domain name (DNS) so that it is compatible with the CDN.

Figure 2:
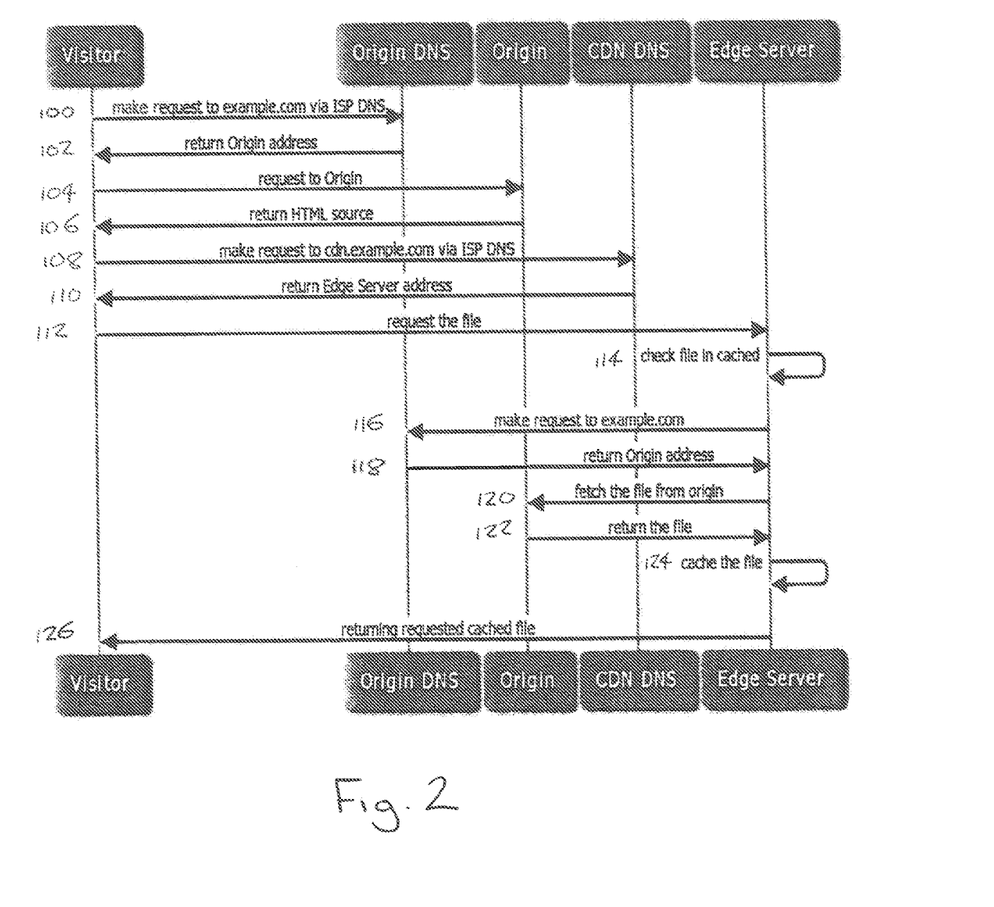
FIG. 2 is a diagram showing a sequence of communications that can occur in a traditional CDN when a visitor's browser requests a web page.

FIG. 2 is a diagram showing a sequence of communications that can occur in a traditional CDN when a visitor's browser requests a web page. At step 100 a visitor makes a request to a website example.com which is received at the Internet Service Provider (ISP) domain name (DNS). At step 102 the ISP DNS returns a numerical IP address corresponding to the origin server. At step 104 the visitor's browser submits a request for website content to the numerical IP address corresponding to the origin. At step 106 the origin returns HTML source code for the website to the browser. As explained above the website owner will have made a number of changes to the HTML source code in their website in order to participate in the CDN. In particular, the HTML source code will have been changed so that the addresses of static content items refer to the CDN. Thus, at step 108 the browser will request static content items from addresses in the CDN referenced in the HTML source code (cdn.example.com). At step 110 the browser's request will be received at the CDN DNS and a numerical IP address for a specific edge server will be returned to the browser. At step 112 the browser will request the relevant static content item from the edge server at the numerical IP address returned at step 110. At step 114 the edge server will check whether the relevant static content item is stored in its local cache. If the static content item is available then it will be provided to the visitor's browser at step 126. In this way the visitor can be provided with website content from a CDN, rather than a single origin server.

An optional series of steps may be performed if the edge server does not have the relevant static content item in its local cache at step 114. Specifically the edge server can request the relevant content item from the origin DNS at step 116; the edge server is aware of the origin address details because this is provided by the website host during registration. At step 118 the origin DNS will return a numerical IP address to the edge server. At step 120 the edge server will request the relevant file from IP address provided at step 118. At step 122 the origin server will provide the relevant file to the edge server, and the file will be cached at step 124. Thus, this optional series of steps only need to be performed the first time that the relevant static content item is requested from a specific edge server. Any subsequent requests for the static content item can be satisfied by the content item stored in the local cache.

A problem arises in respect of traditional CDN networks because the addresses for any static content items must be changed manually in the HTML source code at the origin. Additionally, changes must be made to the website's DNS entries to serve it from the CDN; this requires time and technical skill that is often not possessed by website administrators. This may be considered a barrier to implementing a website in a CDN. Website providers who lack the necessary time and technical skill may tolerate poor website performance to avoid the difficulties associated with CDN implementation.

An object of the present disclosure is to remove barriers and provide an apparatus and method that can allow a website to be provided more conveniently in a CDN.

According to the present disclosure there is provided a computer system comprising: an interface configured to receive a request for web content from a browser; one or more processors configured to retrieve web page source code from a host computer, in response to the request, wherein the web page source code includes an address for a content item, to modify the retrieved web page source code by changing the address, and to send the modified web page source code to the browser.

The browser is typically designed to acquire the content item from the address specified in the web page source code. By modifying the web page source code it is possible to direct the browser to an alternative address, other than that originally intended by the host. In this way it is possible to direct the browser to an address associated with a CDN. This can provide a mechanism for enabling a CDN for a website. A re-router may be required between the interface and the one or more processors which may be arranged in a CDN accelerator.

Typically the web page source code will be HTML source code. In this arrangement, HTML source code can be modified by the computer system in transit between the host computer and the user's browser. The address for a content item can therefore be modified or re-written without any explicit awareness of the host computer. This is advantageous because it can enable a CDN without the implementation of any specific changes in the host computer. The host computer can supply standard HTML source code in response to a normal request from a browser. The computer system can then modify the address in the web traffic between the host and the browser without implementing any specific software or hardware changes in the host computer. This can lower the barrier to CDN implementation for a website. The website administrator simply needs to indicate a desire to implement the website in a CDN. All of the necessary steps can then be undertaken by the computer system.

The present disclosure may be implemented in a virtualised or a non-virtualised environment. In a virtualised environment the computer system may be provided in a hypervisor. In a non-virtualised environment the computer system may be provided in a router to a dedicated server.

Typically a CDN comprises a number of edge servers that can deliver content and decision logic. The decision logic preferably instructs a specific edge server to deliver content to the browser according to a number of factors including current demand in the network, geographic location of the browser and the servers, and current data speeds. The selected edge server is often the server that can supply content to the browser most rapidly. This can enable faster loading of content by the browser and other advantages such as improved data redundancy and improved resistance to DoS (denial-of-service) attacks.

Preferably the one or more processors are configured to search the retrieved web page source code for addresses relating to static content items and to modify the web page source code by changing any identified addresses. This can provide a technique for dynamically changing addresses in the web traffic between the host and the browser without introducing noticeable delays.

Some examples of static content items include image files, Javascript, Cascading Style Sheet (CSS), HTML, document files, pdf files, and Flash (FLV or F4V). The addresses for any of these static content items can be changed so that the content items can be acquired from a CDN.

Preferably, when modifying the address of any static content items, the one or more processors are also configured to embed address details for the origin. In this way any edge servers in the CDN can easily retrieve data from the origin because the address details are immediately available. In fact, this allows edge servers to discover the origin address automatically.

According to another aspect of the disclosure there is provided a computer network comprising: a host computer comprising a data storage unit in which web page source code including an address for a content item is stored; a user device including a browser, wherein the browser is configured to request web content from the host computer; and a computer system comprising an interface for receiving the request for web content from the browser and one or more processors configured to retrieve web page source code from the host computer, in response to the request, wherein the one or more processors are configured to modify the retrieved web page source code by changing the address, and to send the modified web page source code to the browser.

Preferably the user device is configured to request the content item from the changed address when the modified HTML source code is received by the browser. In this way the computer system can modify the address of the content item in the web traffic between the host computer and the browser. The browser can acquire the content item from the address determined by the computer system and load the web page.

Preferably the network also comprises a server for providing the content item to the browser, wherein the address of the server corresponds to the changed address determined by the computer system. The requested content item can therefore be provided from a cache in an edge server of a CDN. If the requested content item is not available in the cache then the server may acquire the content item from the host computer so that it can be stored locally.

According to another aspect of the disclosure there is provided a method comprising the steps of: receiving a request for web content from a browser; retrieving web page source code from a host computer, including an address for a content item; modifying the retrieved web page source code by changing the address; and sending the web page source code including the changed address for the content item to the browser.

According to yet another aspect of the disclosure there is provided a non-transitory computer readable storage medium comprising program modules that when operated on by a computer will cause the computer to perform the steps of: receiving a request for web content from a browser; retrieving web page source code from a host computer, including an address for a content item; modifying the retrieved web page source code by changing the address; and sending the web page source code including the changed address for the content item to the browser.

Apparatus features may be provided as corresponding method features and vice-versa.

Embodiments of the present disclosure will now be described, by way of example only.

Figure 3:
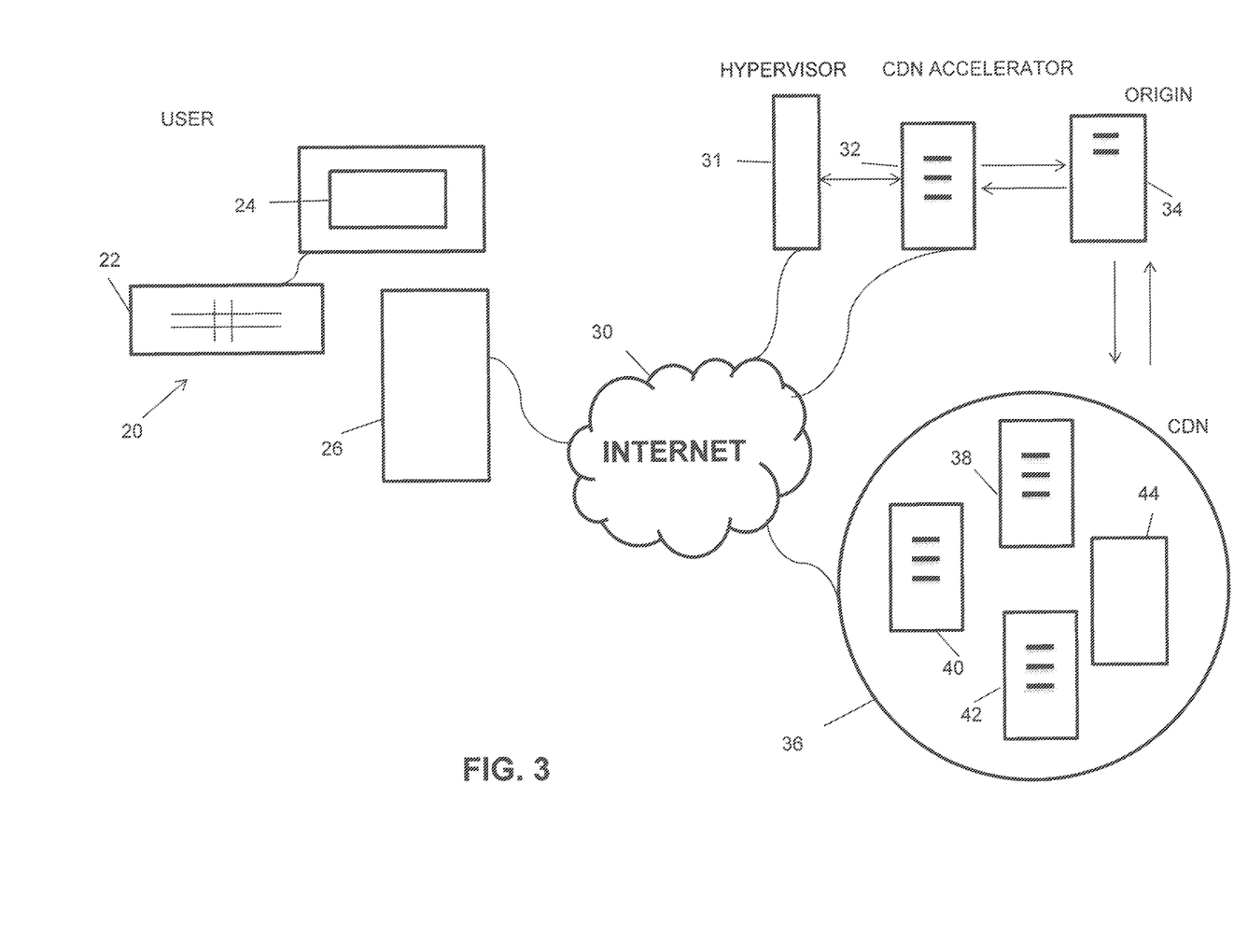
FIG. 3 is a schematic view of the participants in a CDN, according to one embodiment of the present disclosure.

FIG. 3 shows the participants in a CDN in an embodiment of the disclosure. A user device 20 is provided having a keyboard 22, display 24 and interface 26 to the internet 30. A web browser is also provided in the user device 20. Although the user device 20 is depicted as a desktop computer in FIG. 3 it could equally be arranged, for example, as a tablet computer, smart phone or personal digital assistant (PDA).

A hypervisor 31 and a CDN accelerator 32 including processing circuitry are also connected to the internet 30. In addition, the network comprises an origin computer 34 which may be configured as a server, hosted by the hypervisor 31. The HTML source code for a website is stored in a data storage unit in the origin computer 34. A CDN 36 is also provided having a number of edge servers 38, 40, 42 and a load balancer 44.

Figure 9:
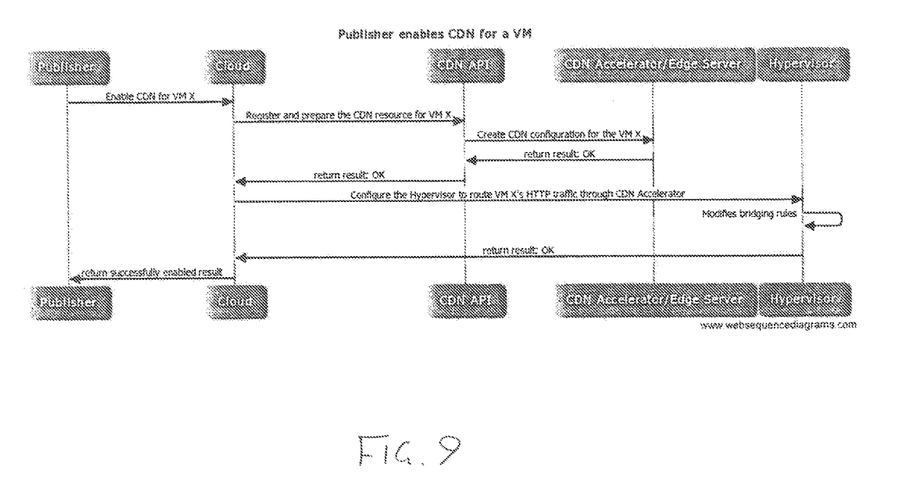
FIG. 9 is a flow diagram showing how a website host can enable a CDN for a virtual machine using a CDN accelerator in an embodiment of the present disclosure.

The website host enables CDN for his virtual machine using a cloud management interface. The cloud management interface registers and prepares the necessary CDN configuration. Then, it configures the hypervisor 31 to route traffic for the virtual machine through the CDN accelerator 32. Hereafter, all websites on the virtual machine are delivered automatically on the CDN. The website host does not need to change the domain name (DNS) for any hosted websites in this arrangement. The operation of this system is illustrated in the flow diagram of FIG. 9.

Figure 4:
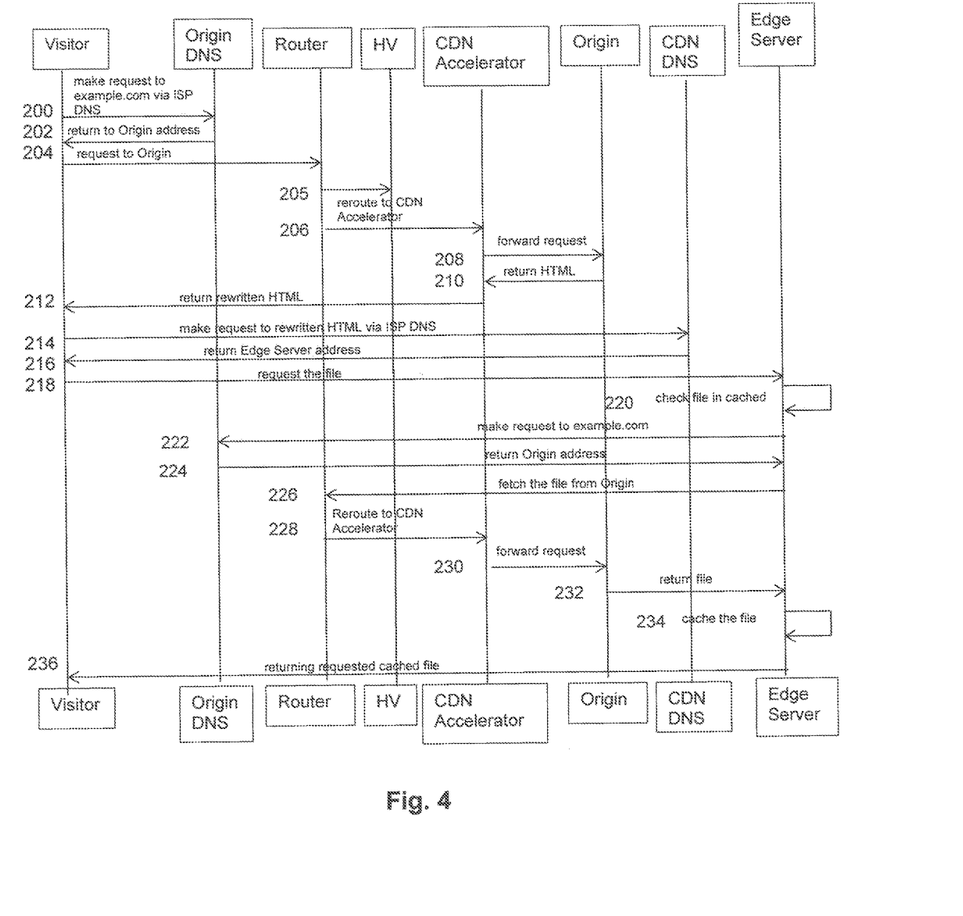
FIG. 4 is a diagram showing a sequence of communication steps that can be performed in an embodiment of the present disclosure.

The operation of the present disclosure will now be described with reference to FIG. 4 which shows a sequence of communication steps. At step 200 a visitor 20 makes a request for a website (example.com), and the request is received at the Internet Service Provider (ISP) domain name (DNS). At step 202 the ISP DNS returns a numerical IP address to the browser, corresponding to the hypervisor 31 where the website is hosted. At step 204 the browser requests content from the numerical IP address corresponding to the router. At step 205 the router forwards the relevant request to the hypervisor 31. At step 206 the hypervisor 31 re-routes this request to the CDN accelerator 32. At step 208 the CDN accelerator 32 forwards the request to the origin computer 34. At step 210 the origin computer 34 returns HTML source code to the CDN accelerator 32.

At step 212 the CDN accelerator 32 searches through the HTML source code retrieved from the origin computer 34 in order to identify addresses associated with static content items. Examples of static content items include image files, javascript, flash video/audio files or mp3 files. The CDN accelerator 32 then modifies the addresses for static content items so that they refer instead to addresses in a CDN. The CDN accelerator 32 can also embed the address of the origin in the new address for the static content item. Finally, the CDN accelerator sends the modified HTML source code to the user 20.

In one example at step 212 the HTML source code retrieved from the origin computer may refer to the webpage www.example.com that includes a logo file with the address "www.example.com/images/logo.jpg". The CDN accelerator 32 may identify this static content item and modify the HTML source code to refer instead to http://www-example-com.1-2-3-4.cdnproviderdomain.com/images/logo.jpg. This modified HTML source code points the user to the CDN at www-example-com and includes an embedded IP address 1.2.3.4 which refers to the origin.

At step 214 the user 20 receives the modified HTML source code from the CDN accelerator 32. The user 20 then attempts to load the website by acquiring static content items from the addresses given in the HTML source code. Thus, at step 214, the user 20 attempts to acquire static content items from the CDN using the address details provided by the CDN accelerator 32. At step 216 the CDN DNS returns a numerical IP address for one of the edge servers 38, 40, 42 in the CDN 36. At step 218 the browser requests the static content item from the IP address returned at step 216. At step 220 the edge server checks whether the requested content item can be found in a local cache. At step 236 the relevant edge server returns the requested static content item to the browser if the item can be located in the local cache. Thus, the website can be loaded in the browser including the static content items provided from an edge server in the CDN. This can be achieved with minimal effort on behalf of the website administrator because the modification of HTML source code is performed by the CDN accelerator 32 in the web traffic between the origin 34 and the user 20.

Steps 222 to 236 are performed if the relevant edge server does not have the requested static content item in its local cache. In these circumstances the edge server will request the content item from the origin DNS at step 222. The edge server is directed to the origin DNS by the origin address details embedded in the address by the CDN accelerator 32 at step 212; in the example above the origin address would correspond to the IP address 1.2.3.4. At step 224 the origin DNS will return a numerical IP address to the edge server. At step 226 the edge server will request the relevant file from the hypervisor 31. This request is forwarded to the CDN accelerator at step 228, and at step 230 the CDN accelerator 32 forwards the request to the origin computer 34. At step 232 the origin computer 34 returns the relevant file to the edge server so that the file can be cached at step 234. This sequence of steps only needs to be performed the first time that the relevant static content item is requested from the edge server. Once the file has been acquired any subsequent requests for the static content item can be satisfied from the local cache in the relevant edge server.

Figure 5:
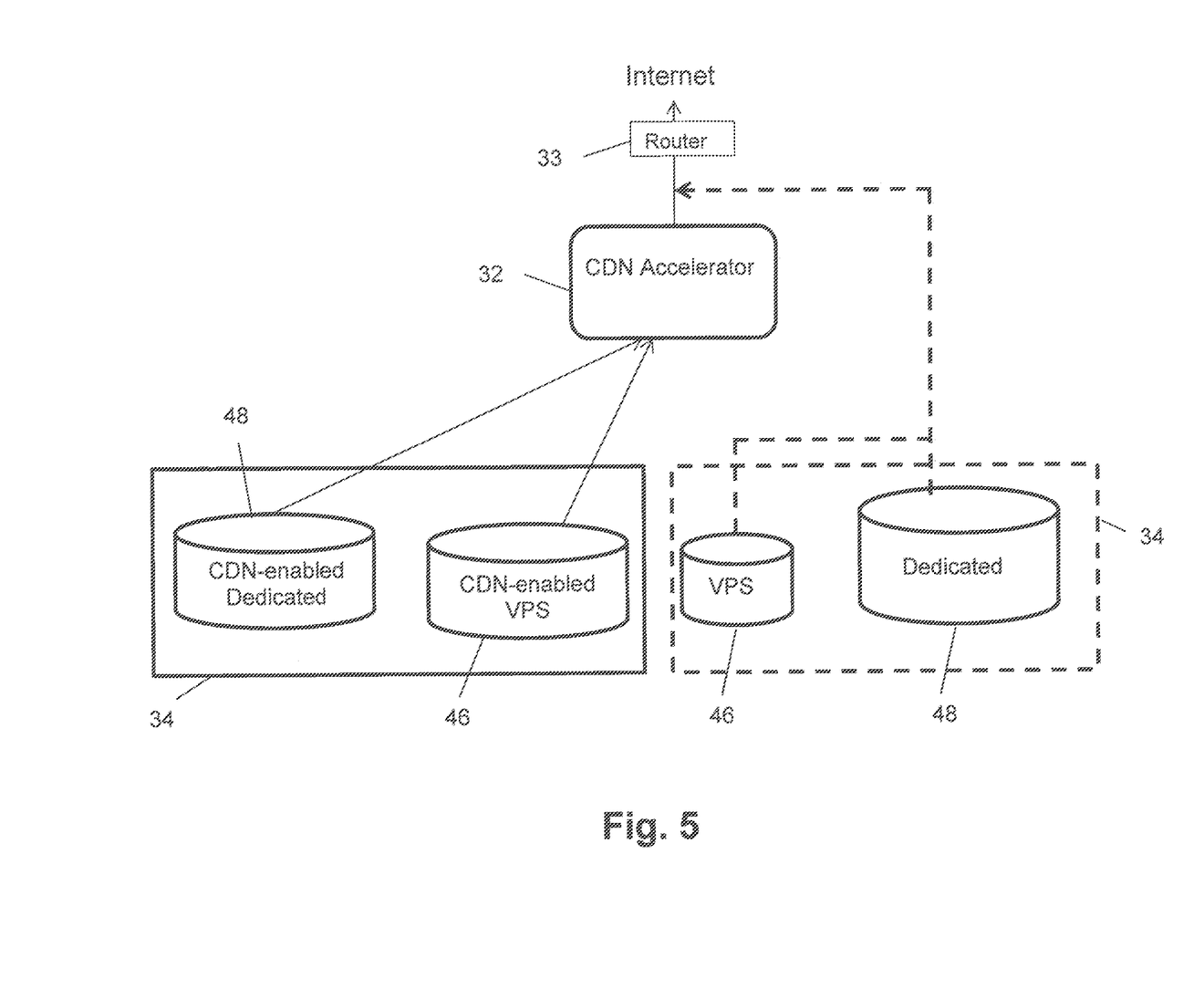
FIG. 5 shows a representation of the physical environment for an origin server and a CDN accelerator in an embodiment of the present disclosure.

FIG. 5 is a schematic representation of the physical environment of the origin server 34 and CDN accelerator 32. The origin server 34 includes a virtual private server (VPS) 46 and a dedicated data storage unit 48. The VPS 46 and the data storage unit 48 are CDN enabled because any HTML source code is supplied through the CDN accelerator 32.

FIG. 5 also shows a representation of the physical environment for an origin server 34 in the absence of the CDN accelerator 32. In these circumstances the VPS 46 and data storage unit 48 supply data directly to the internet, via a router 33. Thus, the website is not CDN enabled by the CDN accelerator 32.

Figure 6:
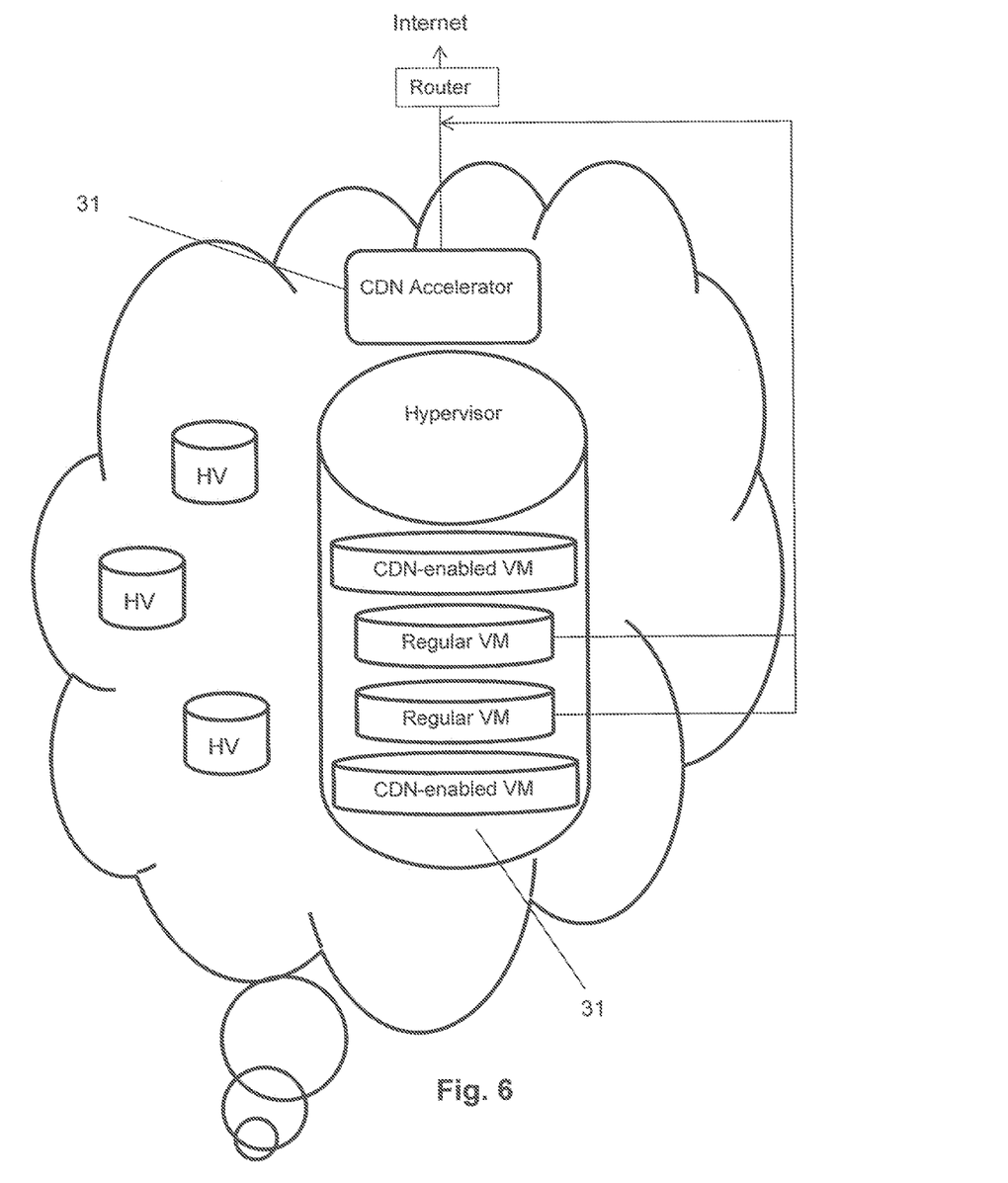
FIG. 6 is a schematic representation of the virtualised environment of a hypervisor and CDN accelerator in an embodiment of the present disclosure.

FIG. 6 is a schematic representation of the virtualised environment of a hypervisor 31 and CDN accelerator 32. The hypervisor 31 hosts CDN-enabled virtual machines (VM) for which data is routed through the CDN accelerator 32. In addition, the hypervisor hosts regular VMs for which data is sent to the internet via a router, but bypassing the CDN accelerator 32.

Figure 7:
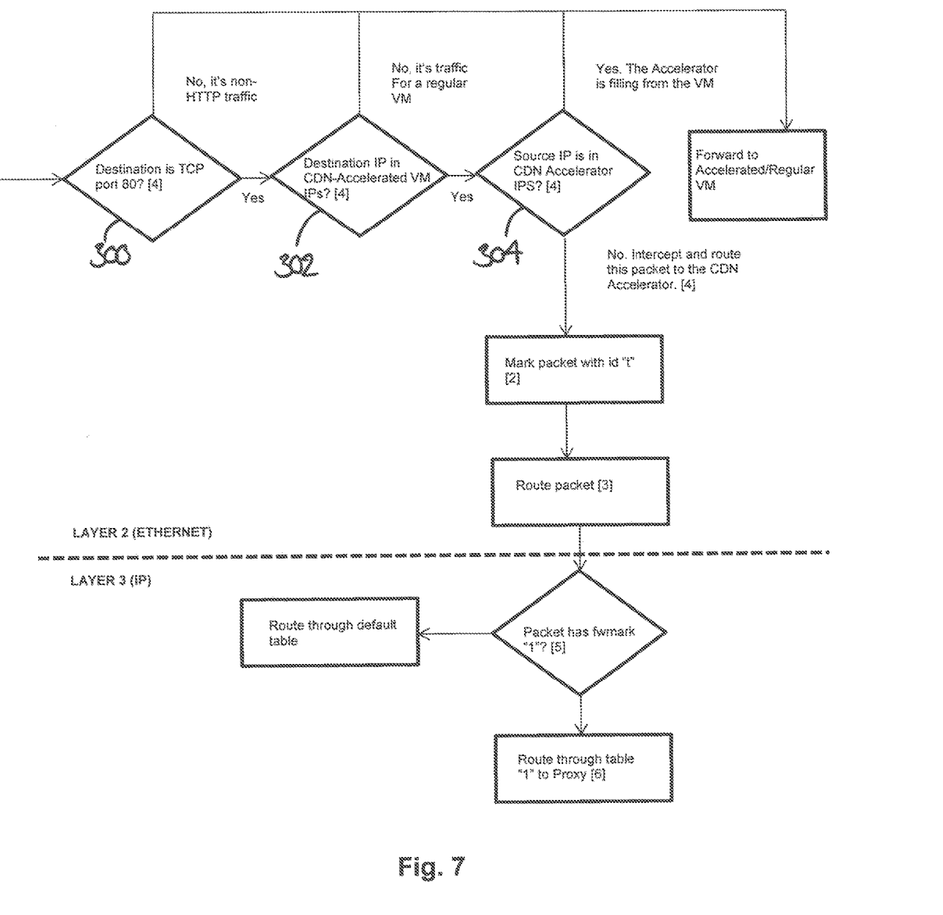
FIG. 7 is a flow diagram showing how packets are routed in a hypervisor in an embodiment of the present disclosure.

FIG. 7 is a flow diagram showing how packets are routed in a hypervisor 31. At steps 300, 302, 304 the hypervisor 31 makes a number of enquiries into a packet received from a public network bridge. In particular, at step 300 the hypervisor 31 checks that the destination is Transmission Control Protocol (TCP) port 80, which is commonly used for HTTP. At step 302 the hypervisor 31 checks that the packet destination is an IP address associated with a CDN-enabled VM. At step 304 the hypervisor 31 checks that the source IP is in the CDN accelerator 32. If all of these checks are positive then the packet is marked and is routed to the CDN accelerator 32. Otherwise the packet is routed to a regular VM hosted by the hypervisor 31.

Figure 8:
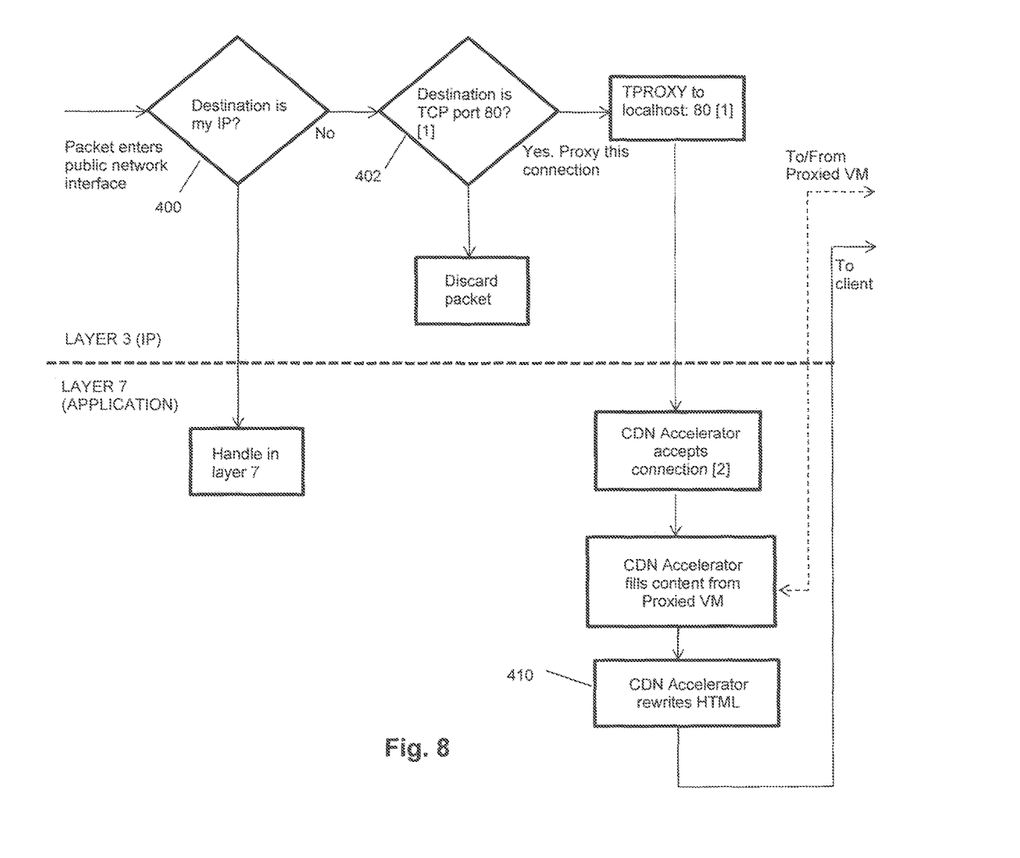
FIG. 8 is a flow diagram showing how packets are processed in a CDN accelerator in an embodiment of the present disclosure.

FIG. 8 is a flow diagram showing how packets are processed in a CDN accelerator 32. The packet destination should be associated with the user's browser. Therefore, at step 400 the CDN accelerator 32 checks whether the packet destination is the same as the CDN accelerator 32 IP address. At step 402 the CDN accelerator 32 checks whether the packet destination is TCP port 80. If this requirement is met then the CDN accelerator 32 accepts the packet and modifies the HTML source code. In particular, the CDN accelerator 32 re-writes the addresses for static content items in the HTML source code at step 410. The CDN accelerator 32 then supplies the modified HTML source code to the user's browser.

As can be appreciated by those having skill in the art, many changes may be made to the details of the above-described embodiments without departing from the underlying principles of the invention. The scope of the present invention should, therefore, be determined only by the following claims.

What is claimed is:

1. A computer system comprising:
    an interface configured to receive a request for web content from a browser in a user device;
    one or more processors configured to retrieve web page source code from a host computer, in response to the request, wherein the web page source code includes an address for a content item, to modify the retrieved web page source code by changing the address, and to send the modified web page source code to the browser in the user device, wherein the one or more processors of the computer system are configured to modify the retrieved web page source code dynamically by changing the address for the content as the retrieved web page source code is communicated between the host computer and the browser in the user device.

2. The computer system of claim 1 wherein the changed address is in a content delivery network (CDN).

3. The computer system of claim 1 wherein the one or more processors are configured to search the retrieved web page source code for addresses relating to static content items and to modify the web page source code by changing any identified addresses.

4. The computer system of claim 1 wherein the web page source code is HTML source code.

5. The computer system of claim 1 wherein, when modifying the address of any static content items, the one or more processors are also configured to embed address details for the origin.

6. A computer network comprising:
    a host computer comprising a data storage unit in which web page source code including an address for a content item is stored;
    a user device including a browser, wherein the browser is configured to request web content from the host computer; and
    a computer system comprising an interface for receiving the request for web content from the browser and one or more processors configured to retrieve web page source code from the host computer, in response to the request, wherein the one or more processors are configured to modify the retrieved web page source code by changing the address, and to send the modified web page source code to the browser, wherein the one or more processors of the computer system are configured to modify the retrieved web page source code dynamically by changing the address for the content as the retrieved web page source code is communicated between the host computer and the browser in the user device.

7. The computer network of claim 6 wherein the user device is configured to request the content item from the changed address when the modified HTML source code is received by the browser.

8. The computer network of claim 7, further comprising a server for providing the content item to the browser, wherein the address of the server corresponds to the changed address.

9. The computer network of claim 8 wherein the server comprises a data storage unit for the content item, and wherein the server is configured to acquire the relevant content item from the host computer if it cannot be located in the data storage unit.

10. A computer-implemented method of electronic content delivery comprising sequential steps of:
    receiving over a network at a computing device a request for web content from a browser of a user device;
    retrieving by the computing device web page source code from a host computer, including an address for a content item;
    modifying on the computing device, using one or more processors, the retrieved web page source code by changing the address; and
    sending over the network the web page source code including the changed address for the content item to the browser in the user device,
    wherein the one or more processors of the computer system are configured to modify the retrieved web page source code dynamically by changing the address for the content as the retrieved web page source code is communicated between the host computer and the browser in the user device.

11. A non-transitory computer readable storage medium comprising program modules that when operated on by a computer will cause the computer to perform the steps of:
    receiving a request for web content from a browser in a user device;
    retrieving web page source code from a host computer, including an address for a content item;
    modifying the retrieved web page source code by changing the address; and sending the web page source code including the changed address for the content item to the browser, in a user device, wherein the step of modifying the retrieved web page source code is performed dynamically by changing the address for the content as the retrieved web page source code is communicated between the host computer and the browser in the user device.

* * * * *